April 8, 1924.  
A. L. WILLINGHAM ET AL  
SNATCH HITCH  
Filed Nov. 29, 1922

1,490,053

Inventor  
A. L. WILLINGHAM.  
E. S. TUCKER.  
by J. Q. Newton  
Attorney

Patented Apr. 8, 1924.

1,490,053

UNITED STATES PATENT OFFICE.

ARUE LEE WILLINGHAM AND ELMER S. TUCKER, OF FORSYTH, GEORGIA.

SNATCH HITCH.

Application filed November 29, 1922. Serial No. 604,103.

*To all whom it may concern:*

Be it known that we, ARUE LEE WILLINGHAM and ELMER S. TUCKER, citizens of the United States, residing at Forsyth, in the county of Monroe and State of Georgia, have invented certain new and useful Improvements in Snatch Hitches, of which the following is a specification.

This invention relates to draft attachments for tractors, and has special reference to a draft attachment for tractors of the Fordson type.

More particularly, the invention relates to a draft attachment, by which different vehicles and apparatus may be quickly connected to the tractor.

It has frequently happened that tractors of the Fordson type, in attempting to draw heavy loads have raised at their front end and fallen over backward, this being because the powerful torque on the rear axle reacts on the tractor frame, and when the wheels are held stationary with excessive weight behind the tractor, this reaction turns the tractor frame about the axle instead of driving the entire tractor forward.

One important object of the invention is to provide a novel arrangement of traction attachment for tractors of this description wherein this rearing upward of the front end of the tractor so as to cause the same to fall over will be prevented.

In tractors of the Fordson type, the draft bar or draft eye is fixed in position, and many draft poles from farm machinery or trailers, wagons and the like, have to be brought down to the position of the draft bar. This results frequently in throwing the apparatus to which the tractor is attached out of its proper position with relation to the road or field.

A second important object of the present invention is to provide a draft attachment for tractors of this type wherein the drawn vehicle or apparatus may be attached at any desired height so that the vehicle or apparatus may maintain its correct position with relation to the road or field.

With the above and other objects in view, as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1:
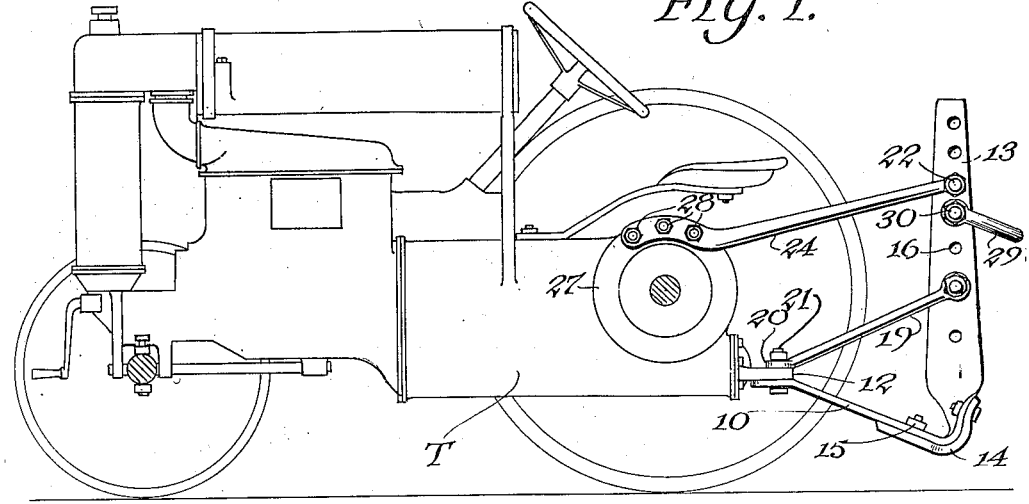
Fig. 1 is a side elevation of the device shown in position on a Fordson tractor, the latter being shown in light outline only.
Figure 2:
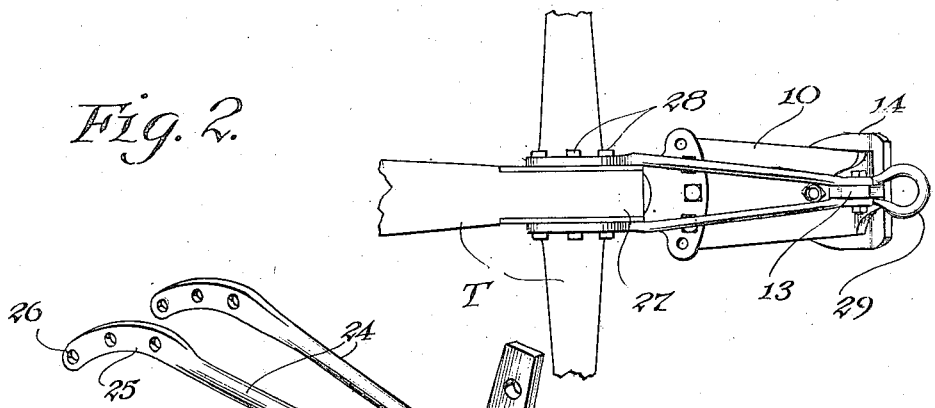
Fig. 2 is a plan view of the device, also showing its relation to that part of the tractor to which it is attached.
Figure 3:
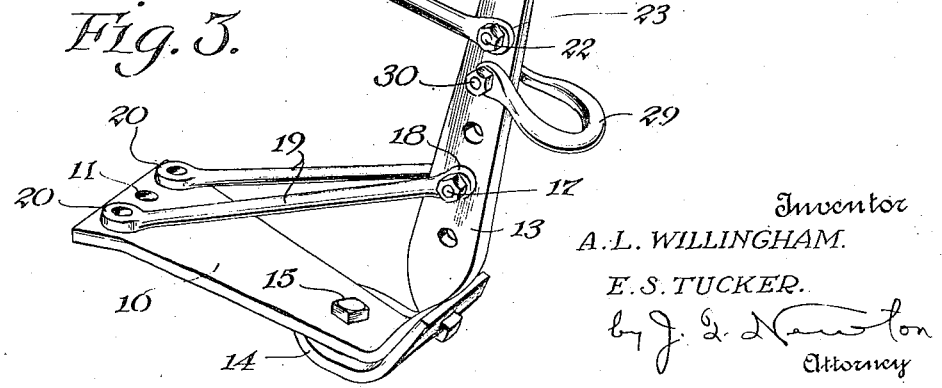
Fig. 3 is a perspective view of the device removed from the tractor.

In the form of the invention herein disclosed, there is provided a heavy bar of metal which tapers throughout its length, the wider end of this bar being indicated at 10, and provided adjacent its extremity with several bolt receiving openings 11. This wider end is formed to rest beneath, at its forward end, the draw bar 12 of the tractor T. Furthermore, this portion 10 extends downwardly and rearwardly from the draw bar 12, and is twisted at its lower end and extended vertically upward in a portion 13 constituting a clevis bar. The portion 10 thus constitutes a trail member somewhat similar to the trail found on field guns and the like, while the clevis bar extends vertically from the lower rear end of such trail member. Fixed beneath the lower rear end of the trail member and to the rear of the clevis bar 13, is a shoe 14, which is secured in position by suitable bolts 15. The clevis bar 13 is provided throughout its length with spaced bolt receiving openings 16, and through one of these openings, as may be selected, fastens a bolt 17. On each side of the clevis bar on this bolt are located eyes 18 of lower brace members 19, which extend forwardly from the clevis bar, and are provided at their forward ends with horizontal eyes 20 adapted for positioning in alinement for certain of the openings 11. The eyes 20 lie, when the device is attached, above the draw bar 12 of the tractor, and bolts 21 pass through these eyes, the openings in the draw bar 12 and through the openings 11, thus connecting the trail member and clevis bar firmly with the draw bar 12.

Through a second selected opening 16 passes a second bolt 22, and on the eyes of this bolt are receiving eyes 23 of the upper brace members 24, which extend forwardly, and have their forward ends arcuately curved as at 25, these curved portions being provided with spaced bolt receiving openings 26. The curvature of the portions 25 is such that they will fit against the opposite sides of the differential housing flanges 27 so that the securing bolts 28 of these flanges may be also used for the securing of these curved ends to the differential housing. It will be obvious from Figure 1, that a construction such as this provides a vertical clevis bar which is held rearwardly of the tractor in a firm and rigid manner, and which will act, in the event of the front wheels of the tractor rising from the ground, to engage the ground to the rear of the rear wheels, and thus prevent the tractor toppling over backwards. For the purpose of quickly hooking and unhooking a vehicle or piece of machinery to the clevis bar, there is provided a clevis link 29, which is secured in desired position on the clevis bar by means of a bolt 30 passing through one of the remaining bolt receiving openings 16. Thus the clevis link may be adjusted up or down the clevis bar, and the draft brought at the desired position, both for its effect on the tractor and for its effect on the vehicle or machinery which is being drawn.

There has thus been provided a simple and efficient device of the kind described and for the purpose specified.

Having thus described the invention, what is claimed as new, is:—

1. An attachment for tractors comprising a trail member rigidly attachable to and adapted to extend rearwardly and downwardly from the tractor frame, a clevis bar extending upwardly from the lower rear end of the trail member, and braces having their rear ends adjustably attached to the upper part of the clevis bar and their front ends attachable above the attachment of said member to the tractor frame.

2. An attachment for tractors comprising a trail member adapted to extend rearwardly and downwardly from the draft bar of a tractor, a clevis bar extending upward from the lower end of the trail member, braces having their rear ends adjustably attached to the upper part of the clevis bar and their front ends attachable to the tractor, and other braces connecting the front end of the trail member with the clevis bar above its junction with the trail member.

3. An attachment for tractors of the Fordson type comprising a trail member having openings in its forward end adapted to receive bolts passing through the bolt openings in the tractor draw bar, said trail member being adapted to extend rearwardly and downwardly from the said draw bar, a clevis bar projecting vertically upward from the rear end of said trail member and provided with a series of bolt receiving openings, a pair of brace members each having an eye at each end, the eyes at the rear ends of said brace members being alined with a selected bolt opening in the clevis bar, the eyes at the other ends of said brace members being alined above the openings in the front end of the trail member, a bolt passing through the rear eyes of said brace members and the selected opening in the clevis bar, a second bolt passing through a second selected opening in the clevis bar, a second pair of brace members having eyes at their rear ends through which the second bolt passes, and curved ends on the front of the brace member to fit alongside the differential casing flange, said ends being provided with spaced openings for receiving the ends of certain differential casing bolts of the tractor.

In testimony whereof we hereunto affix our signatures.

ARUE LEE WILLINGHAM.
ELMER S. TUCKER.